US007271929B1

(12) United States Patent
Tannenbaum

(10) Patent No.: US 7,271,929 B1
(45) Date of Patent: Sep. 18, 2007

(54) SYSTEM AND METHOD FOR INTEGRATED PRINTING AND ASSEMBLY OF ELECTRONIC DOCUMENTS

(75) Inventor: David H. Tannenbaum, Dallas, TX (US)

(73) Assignee: Union Beach, L.P., Dallas, TX (US)

( * ) Notice: Subject to any disclaimer, the term of this patent is extended or adjusted under 35 U.S.C. 154(b) by 0 days.

(21) Appl. No.: 10/946,597

(22) Filed: Sep. 21, 2004

(51) Int. Cl.
*G06F 3/00* (2006.01)

(52) U.S. Cl. ............... 358/1.15; 358/1.2; 358/1.9; 358/1.11; 358/1.12; 709/205; 709/206; 709/207; 709/240; 709/244; 715/526; 715/527; 715/529; 715/530; 715/531

(58) Field of Classification Search ............... 358/1.15, 358/1.2, 1.9, 1.11, 1.12, 1.18; 709/205, 206, 709/207, 240, 244; 715/526, 527, 529, 530, 715/531
See application file for complete search history.

(56) References Cited

U.S. PATENT DOCUMENTS

| | | | | |
|---|---|---|---|---|
| 5,528,742 | A * | 6/1996 | Moore et al. ............... | 715/542 |
| 5,615,015 | A * | 3/1997 | Krist et al. ................. | 358/296 |
| 5,793,938 | A * | 8/1998 | Jackson, Jr. ............... | 358/1.15 |
| 5,893,129 | A * | 4/1999 | Pollard ....................... | 715/522 |
| 6,076,076 | A * | 6/2000 | Gottfreid .................... | 705/45 |
| 6,134,568 | A * | 10/2000 | Tonkin ....................... | 715/526 |
| 6,173,295 | B1 * | 1/2001 | Goertz et al. ............... | 715/505 |
| 6,216,159 | B1 * | 4/2001 | Chintakrindi et al. ....... | 709/220 |
| 6,476,930 | B1 * | 11/2002 | Roberts et al. ............. | 358/1.18 |
| 7,047,490 | B1 * | 5/2006 | Markovic et al. ........... | 715/527 |
| 7,061,636 | B2 * | 6/2006 | Ryan et al. ................. | 358/1.15 |
| 2002/0097407 | A1 * | 7/2002 | Ryan et al. .................. | 358/1.1 |
| 2004/0135805 | A1 * | 7/2004 | Gottsacker et al. ......... | 345/751 |
| 2005/0018229 | A1 * | 1/2005 | Gusler et al. ................ | 358/1.1 |

FOREIGN PATENT DOCUMENTS

| | | | |
|---|---|---|---|
| GB | 2391668 | * | 9/2002 |
| WO | WO 01/031465 A1 | * | 5/2001 |

* cited by examiner

*Primary Examiner*—Aung S. Moe
*Assistant Examiner*—Jacob P Rohwer
(74) *Attorney, Agent, or Firm*—Fulbright & Jaworski LLP

(57) ABSTRACT

In one embodiment there is disclosed an application program in which a document is created containing complex rendering codes which codes identify locations within the document where material other than the basic medium is to be inserted or where special treatment is required. These rendering codes control, for example, the insertion of tabs, special attributes of the tabs, such as color, printing, etc, the type of binding the document is to have, the type of printing, the type of assembly, the downloading of material from other sources, the tailoring of portions of the document to the end user, etc. During the rendering process the rendering codes are used to insure that the finished product is rendered exactly as contemplated by the document creator even when the document is rendered without assistance from the creator and without the need for communicated directions outside of the created document.

23 Claims, 3 Drawing Sheets

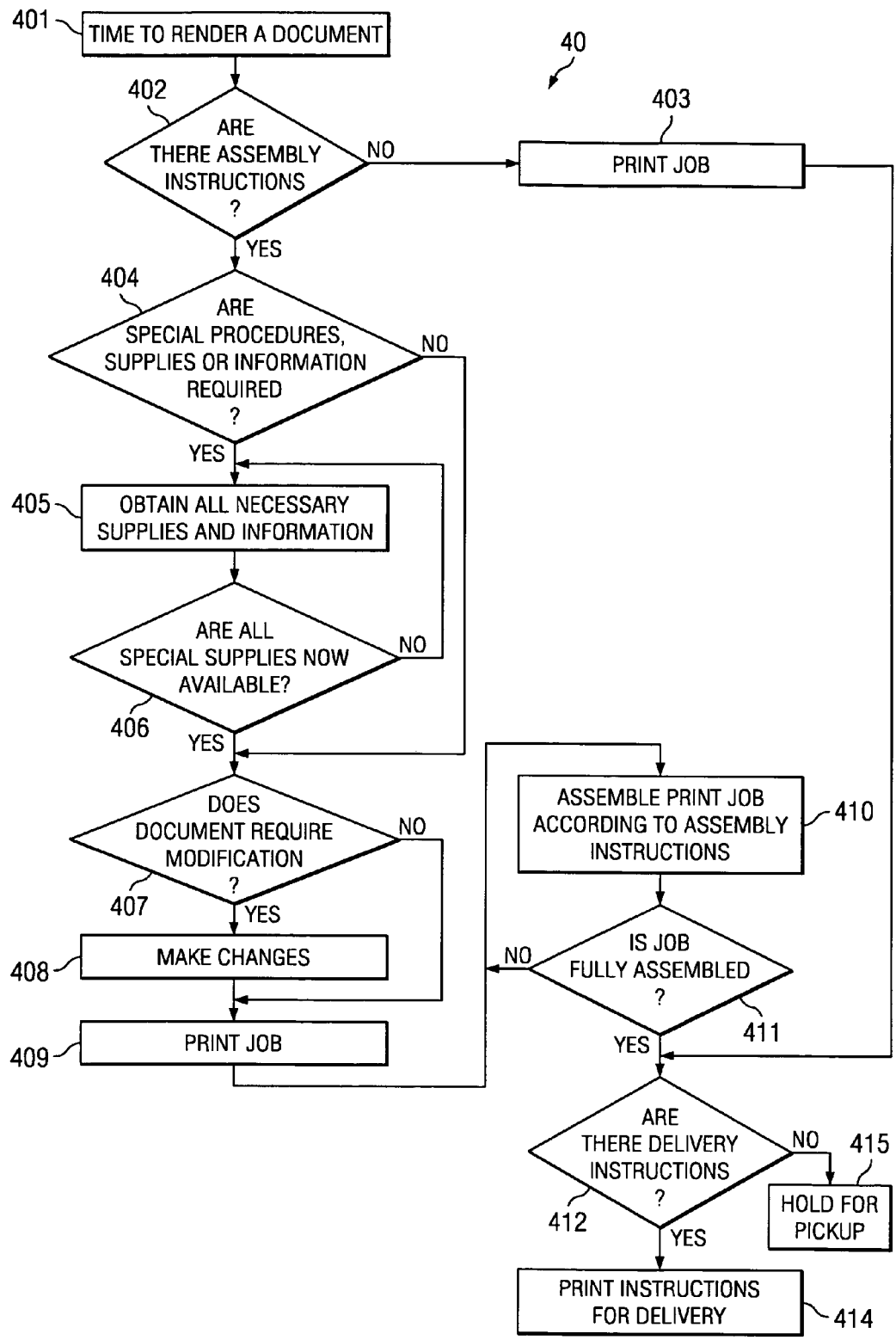

FIG. 5

| | ITEM | COLOR | STYLE | SIZE | MISC | CODE | BASIC DOCUMENT | PAGE |
|---|---|---|---|---|---|---|---|---|
| 510 | PAPER #1 | WHITE | | | | § P0 | TXT.1 | 1 |
| 511 | PAPER #2 | BLUE | | | | § P1 | TXT.1 | 20 |
| 512 | SEPARATOR | TAN | TOOLS | | A, B, C | § S1 | TXT.1 | 3, 18, 12, 19 |
| 513 | BINDER | WHITE | LEFT SIDE | --- | | § B1 | TXT.1 | FRONT |
| 514 | BINDER INSERT | NA | | | | § BI1 | TXT.1 | |
| 515 | OUTER WRAPPING | CLEAR | PLASTIC | --- | --- | § O1 | TXT.1 | ALL |
| 516 | DELIVERY INSTRUCTIONS | NA | SEE LIST | NA | HOLD TO TUESDAY | § D1 | TXT.1 | |
| 517 | OBTAIN INFORMATION | NA | NA | NA | GO TO XYZ@INFO.COM | § I1 | TXT.1 | 18 |
| 518 | SUBSTITUTE INFORMATION | NA | NA | NA | IF X USE B | § S1 | TXT.1 | 18 |

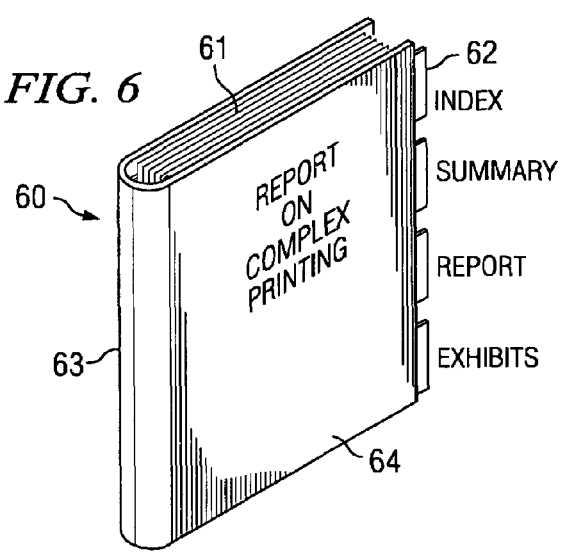

FIG. 6

SYSTEM AND METHOD FOR INTEGRATED PRINTING AND ASSEMBLY OF ELECTRONIC DOCUMENTS

TECHNICAL FIELD

This invention relates to electronic document printing and more particularly to systems and methods for associating with an electronic document assembly instructions such that when the document is printed it can be assembled based on instructions associated with the document.

BACKGROUND OF THE INVENTION

It is now becoming commonplace to send electronic documents to printers for rendering a final printed product. This works well when the document is a simple document having no assembly requirements other than to possibly staple each copy together. Often, however, complex documents are created which require assembly such as, for example, tabs inserted between certain sections, special types of bindings, different paper colors for different sections, added exhibits, etc.

When it is desired to print such complex documents at remote sites a problem exists in communicating the precise manor as to how the complex document is to be assembled. Further problems exist when the assembly process itself requires additional printed material. Thus, for example, when the tabs (or other section separators) must have special printing thereon it is difficult to communicate all of the desired assembly information to a remote source for the proper assembly of the complex document.

Since many documents must be delivered to third parties at remote locations it is important to be able to print and assemble such documents at such remote locations. In fact, commercially available application programs that are used to create documents have embedded in them a myriad of formatting and other control codes that allows, for example, the paper size, tabs, line spacing, font size, font style, etc to be controlled at the time of printing the document. Thus, it is easy to send a document from a creating user to a recipient and when the recipient prints out the document (or views it on a screen) the look and feel of the document is presented as the creating user determined it should be. However, today that same ease of electronic communication does not exist for complex documents. Accordingly, if a complex document is created at a first enterprise it is necessary to assemble that document at that first enterprise and then mail (or courier) the document to a second enterprise. This is so because it is not practical to ask the recipient (who could be a sales prospect, a Governmental institution, or even a friend) to, for example, print a document, create different color tabs having certain markings on each tab, insert paper of a certain color ahead of each section, bind the document in a certain way, etc. The problem is compounded when it is required to add information to the document just prior to printing or assembly of the document.

BRIEF SUMMARY OF THE INVENTION

In one embodiment there is disclosed an application program in which a document is created containing complex rendering codes which codes identify locations within the document where material other than the basic medium is to be inserted or where special treatment is required. These rendering codes control, for example, the insertion of tabs, special attributes of the tabs, such as color, printing, etc, the type of binding the document is to have, the type of printing, the type of assembly, the downloading of material from other sources, etc.

During the rendering process the complex rendering codes are used to insure that the finished product is rendered exactly as contemplated by the document creator even when the document is rendered without assistance from the creator and without the need for communicated directions outside of the created document.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 4 shows a process diagram illustrating one embodiment of a system and method for rendering a complex document.

FIG. 5 is a chart showing one embodiment of complex rendering codes used to control the rendering of a document; and FIG. 6 illustrates one embodiment of a complex document rendered using the system and methods disclosed herein.

DETAILED DESCRIPTION OF THE INVENTION

Figure 1:
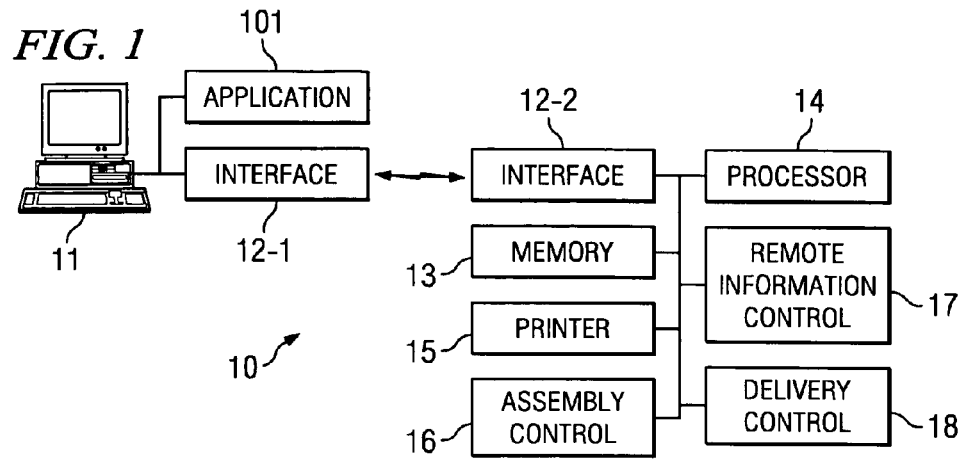
FIG. 1 illustrates one embodiment of a system in which a creating user at a first location sends a complex document to a second location for rendering.

FIG. 1 illustrates one embodiment of system 10 in which a creating user, for example at PC 11 at a first location, sends a complex document, such as, for example, document 60 shown in FIG. 6, to a second location for rendering. For purposes of discussion, a complex document is one that, in addition to the material (text, graphs, charts, etc) created by the user, will have other material added to it at the time the document is rendered, i.e. put in final form ready for an end-user. Such other material can be any type of material other than the material being used for actually printing the document being rendered. By way of example, separators (such as tabs), different colored paper, bindings, packaging, inserting of material from other sources, such as, for example, from a cite on the Internet, or from a different printing run, are all examples of "other" material forming a complex document.

The creating user could use an application program, such as application program 101, to create the document and the application program can have built into it the complex rendering codes, as will be discussed with respect to FIG. 5, which codes control the rendering of complex documents. The creating user could also simply add the complex rendering codes to a header or footer of the document with reference to where in the document the complex rendering code pertains.

Figure 2:
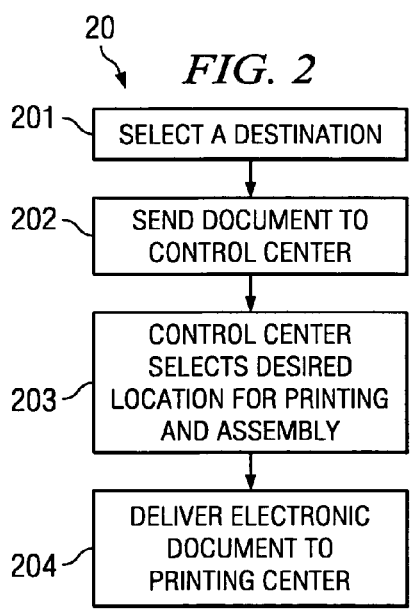
FIG. 2 is a process diagram showing one embodiment of a system and method for sending a document to a central control point for printing at a remote location.

After the document is created, that document is sent using any interface, such as interface 12-1 to a specific location, such as interface 12-2, for subsequent rendering. The interface can be wireless or wire line and will most likely be an Internet or other publicly available network, but it could also be a private network, The document could be communicated directly by the creating user to a certain destination, or, as shown by process 20, FIG. 2, could be to a central destination (process 201) such as a website for a rendering service. In such a situation, the document would be sent to the central destination and process 202, running at the selected central destination in conjunction with process 203 would then direct the document to a particular one of its locations via process 204, for ultimate rendering and perhaps delivery to a final destination. As will be detailed, the precise manner in which the document is ultimately rendered is controlled, at least in part, by the complex rendering codes associated with the document.

Returning now to FIG. 1, at the rendering location a processor, such as processor 14, including, perhaps a PC, controls the storing of the communicated document, together with the complex rendering codes associated therewith in, for example, memory 13. When it is time to render the document the processor directs printer 15 (which could, in some situations be a computer screen of a document receiving party), assembly control 16, remote information control 17 and, if desired, delivery control 18. Remote information control 17 can, for example, obtain the latest information from a third party source for insertion into a document. Depending upon the information content of the obtained information and the complex rendering codes associated with the document, the text of the document might be changed to use alternate text.

By way of example, assume that a recipient user goes to a web site to down load information pertaining to travel in, say France. Included in the downloaded information could be, for example, hotel room rates. The actual rate shown would be the rate available when the document (web site) was established. Using the concepts discussed herein, when it is time to render the document, i.e., deliver the document (or screen information) to a requesting user, the system would know, because of the complex rendering codes associated with the document, to go and obtain the latest room rate and the latest currency converter information for insertion into the rendered document. Thus, when the requesting user views, or prints, the rendered document the latest information would be contained therein, including the actual up to the minute costs to the user. The cost could even be adjusted for the time of the actual stay instead of for the time of booking, if desired. The system could, if desired, and based upon the location of the user at the time of the request, convert the cost into the currency of the user, or the cost could be stated in the currency of the country where the document is rendered.

This same scenario would occur when a requesting user asks for, or when a system is ready to print, a document that is to be delivered to an addressee identified by the creating user. Thus, when the document is being rendered in final form, the system would, under direction of instructions associated with the document, obtain updated information for insertion in the document. Also, if desired, alternative language (pictures, currency, directions, rates, times, etc) could be used in the document depending upon the contents of the updated information and/or depending upon the location of the rendering or the location of the requester of the document.

Figure 3:
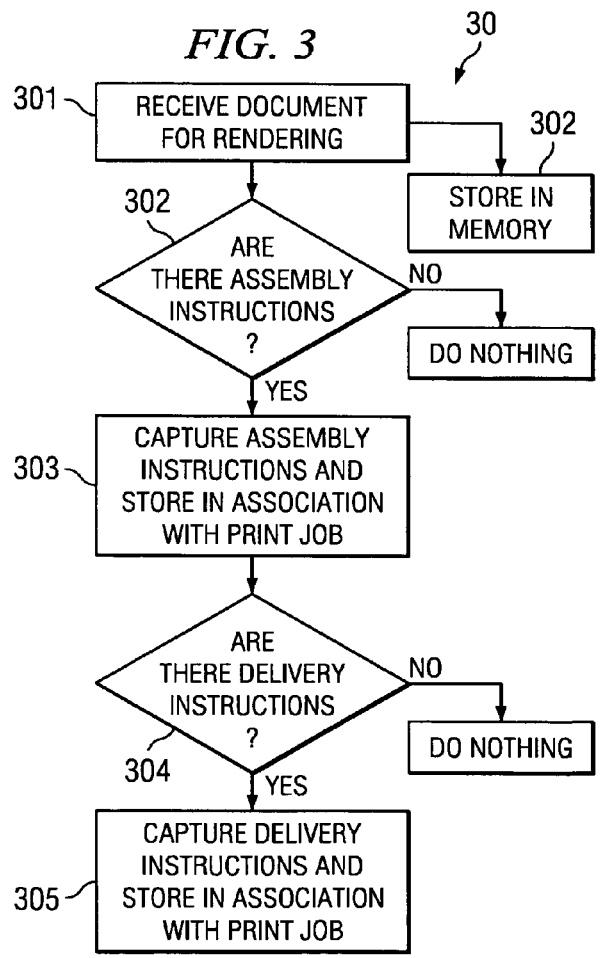
FIG. 3 shows a process diagram illustrating one embodiment of a system and method for receiving a document for rendering.

FIG. 3 shows a process diagram illustrating one embodiment 30 of a system and method for receiving a document (process 301) for rendering. Process 302 checks to see if the document has associated with it any complex rendering codes. These rendering codes could be contained within the body of the document at the location where the instruction is to be carried out, or the rendering codes could be all in one place or could even be in an auxiliary document associated with the document to be rendered. For example, the document to be rendered could be in a self-contained file, such as a text, file. The text file would have a name. The auxiliary file could contain the complex codes and each code would refer to the name of the document to which it pertains and would indicate to the assembly process the page and the "other material" that is required at that specific location within the text file.

If process 302 determines that this is a straight print job (not a complex print job) then nothing further need be done other than to print the document at the appropriate time. However, if process 302 determines that there are complex rendering codes associated with the document then process 303 captures the codes and insures that the codes are stored in association with the proper file. In situations where the codes are already in association, process 303 insures that the system knows that when this job is to be printed it is a complex job that will require additional processing.

Process 304 determines whether or not there are delivery instructions with the rendering job when the job is fully rendered. If so, these instructions are also captured, if necessary to insure proper marking for accurate delivery when rendering is complete. Note that one or more of steps 303/304 can be omitted in situations where the codes are contained in the file, so long as the proper processing is accomplished by the system.

FIG. 4 shows a process diagram illustrating one embodiment 40 of a system and method for rendering a complex document. Process 401 controls when it is time to render a document. This can be as soon as the document has been received, or after the passage of a certain time, or at a certain time of day. This decision can be made by the remote location or can be a mutual decision and can, if desired, be triggered by codes in the document, or transmitted in association with the document. One or more of the complex rendering codes can be used for this purpose if desired.

One delay could be, for example, to wait until a certain report or piece of information becomes available on the Internet. Thus, assume a complex document is to be rendered having in it a graph (latest interest rate, etc) that is not available at the time the document is created, or which changes from time to time. Process 401, perhaps in conjunction with process 404, determines when it is appropriate to render the document. Note that, as controlled by process 407, this same document may be rendered periodically with certain words changed based on the results of information not available when the document was first created or based on the location of the recipient. These word changes can be in the form of alternative language, etc. based on the results of external events. The external events could be, for example, information from a specific web site, the day of the week, the year the document is being rendered, the country or location of rendering, the time zone, etc. The information could be any type of updated information, such as interest rates, currency conversion, hotel rates, latest prices of any commodity, corporation officers, political office holders, etc.

By way of example, using the system and methods discussed herein, governmental or corporate literature or web sites need not change when there is a new office holder. Also, price lists could be printed without regard to whether they were out of date since the rendering codes associated with the document would control the insertion of the latest information in the rendered document by directing the system to the proper location to find that latest information. The system then could be used to print price lists, etc, around the world and the proper prices for each country would be inserted when rendered. If conversion rates were necessary these also could be added at the time the document is rendered.

Process 402 determines if this document is a complex document. If not, the document is printed (process 403) in the normal fashion and process 412 determines if there are delivery instructions. If so, the instructions are created and delivery process 414 begins. If not, process 413 holds the job for pickup.

If process 402 determines that this is a complex rendering job, process 404 determines what special material, procedures, information, etc, is required. Process 405 takes whatever steps are appropriate to obtain all necessary supplies, information, etc and when everything is ready, process 406 checks to determine if alternative text is to be substituted. If so, the alternative text is obtained, sometimes dependant upon the country of ultimate delivery, or based on the country from which the request for the document originated. Process 408 makes the proper changes and the job is printed.

Process 410 assembles the complex document and depending upon the types of assembly this can be manually, partially manually and partially automated or fully automated, all controlled, at least in part, by the rendering codes associated with the document. When the complex document is fully assembled, as controlled by process 411, process 412 is entered to determine delivery instructions as discussed above.

FIG. 5 is a chart showing one embodiment 50 of complex rendering coding used to control the rendering of a document. Chart 50 shows one version of coding in column 506 prefaced with a special code to designate that which follows is a complex code. Any type of code or marker can be used and the ones shown are for illustrative purposes only and the creator of any application program that would be used to facilitate the concepts discussed herein would use codes which are compatible with other codes, such as format codes, already in the application program. If the rendering codes are embedded within the document then their position in the document will control where the action is to be taken. However, if the code is transmitted separate from the document or as a portion of the document but not imbedded in a dispersed manner, then the code would point to the document it pertains to (column 507) as well as to the page it pertains to (column 508). Note that codes for many documents can be contained in a single document so long as the document to which each code pertains is included.

In the embodiment shown, column 501 is the item to be controlled, column 502 gives the color, column 503 the style, column 504 size, and column 505 miscellaneous attributes. Note that these are only representative of the vast number of items that can be added during final rendering of a document.

Rows 510 and 511 show different paper colors where color white begins with page 1 and blue begins on page 20 (column 508) of the document. Row 512 calls out that separators are to be after pages 3, 8, 12, and 19 (column 508) and the separators are in the form of tan (column 502) and tabs (column 503). Row 513 shows that the whole project is to bound with a binder (row 513) without insert (column 514) and then wrapped in clear plastic (row 515, columns 502, 503). Row 516 calls for the rendered project to be held until Tuesday (column 505). Row 517, column 505 gives instructions as to where additional information is to come from, such as "go to XYZ @info.com" and row 518 controls alternative documentation that is to be used, perhaps based on information obtained from "XYZ @info.com". As shown in column 507, all of the instructions in this chart are for the document named "txt.1".

FIG. 6 illustrates one embodiment of a complex document 60 rendered using the system and methods disclosed herein. As shown, document 60 comprises text (or graphs or other material) 61 having tabs 62 with writing on the tabs. The rendered document has a clear plastic binder 64 with a pressure spine binding 63. The final rendered complex document will be printed, the tabs printed and inserted at the proper locations, the exhibits will be added, one of which comes from an internet location, all under control of the complex rendering codes associated with the document.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method for rendering a complex document, said method comprising:

incorporating at least one rendering code with a data text file containing text of a complex document to be rendered, said incorporating comprising adding said rendering code to said data text file;

transmitting said data text file which includes said rendering code from a document creator to a system selected by said document creator, said system not under control of said document creator for rendering; and rendering said document under control of said system; said rendering comprising printing and assembling said complex document in accordance with said rendering code associated with said document, and wherein said printing and assembling is controlled by said rendering code without human intervention wherein said data text file is created using an application program running on a PC and wherein said rendering code is incorporated in said data text file under control of said application program.

2. The method of claim 1 wherein said rendering code includes delivery instructions, said method further comprising:
addressing said rendered document in accordance with said delivery instructions associated with said document.

3. The method of claim 1 wherein said rendering codes control at least one instruction selected from the list of: paper color, separator types, separator printing, binder type, binder printing, outer wrapper type, delivery instructions, data substitution, obtaining updated data, material changes based on delivery location.

4. The method of claim 1 further comprising transmitting said data text file by said document creator to at least one additional rendering system.

5. The method of claim 1 wherein said rendering comprises:
obtaining updated information from a directed location, said directed location being a location external to both said rendering code and to said data text file specified in said rendering code incorporated in said file.

6. The method of claim 5 further comprising:
substituting alternative text based upon said obtained updated information.

7. The method of claim 1 wherein said rendering comprises:
changing at least a portion of the data text based upon the location of the rendered document.

8. The method of claim 1 wherein said rendering comprises:
changing at least a portion of the data text based upon the location of a user requesting said rendering of said document.

9. A system for rendering a printed document, said system comprising:
means for incorporating assembly control instructions into a data file containing text of a document to be rendered;
means for transmitting a combined file to a system for storage prior to said rendering, said combined file containing both said data file and said associated assembly control instructions;
means for printing from storage said document to be rendered;
means controlled directly by said assembly control instructions for assembling said printed document in accordance with said instructions associated with said printed document; said assembling occurring without first displaying an image of said assembled document; and
wherein said assembly instructions are one or more instructions selected from the list of: paper color, paper size, separator types, separator printing, binder type, binder printing, outer wrapper type, delivery instructions wherein said data text file is created using an application program running on a PC and wherein said rendering code is incorporated in said data text file under control of said application program.

10. The system of claim 9 wherein said assembly control instructions include delivery instructions, said system further comprising:
means for printing a delivery address on said assembled document in accordance with said delivery instructions associated with said printed document.

11. The system of claim 9 further comprising:
means controlled by said associated control instructions for obtaining updated information from a location external to said data file for insertion in said rendered document.

12. The system of claim 11 further comprising:
means, based on said obtained information, for using alternative information in said rendered document.

13. A method for delivery of a document, said method comprising:
creating, by a document creator, a document having data to be printed;
adding to said created document by said document creator assembly and delivery instructions, said adding occurring local to said user and said adding making said document a complex document;
transmitting said complex document from said document creator to a central location for delivery to a desired recipient's address;
routing said document to a specific location for printing and assembly; said routing under control of said central location as determined at least partially by said recipient's address;
printing said document at said specific location; and
assembling said document in accordance with said assembly instructions included with said document without first displaying an image of said assembled document wherein said creating is done using an application program running on a PC and wherein said adding is done under control of said application program.

14. The method of claim 13 wherein said assembling is at the same location as said printing.

15. The method of claim 13 further comprising:
delivering said assembled complex document to said recipient address in accordance with said delivery instructions included with said assembly instructions.

16. The method of claim 13 wherein said delivery begins at the same location as said assembling.

17. The method of claim 13 wherein said central location is selected by an originating user.

18. The method of claim 13 wherein said printing location is selected by said central location.

19. A method of delivering a document, said method comprising:
creating during a first time period a document having associated therewith rendering codes;
delivering said document at a subsequent time period upon request to a recipient; and
modifying said document at said second time period as part of said delivering so as to update selected information contained within said document, said updating based, at least in part, on said rendering codes and wherein said modifying is tailored to the location of said recipient wherein said document is created using an application program running on a PC and wherein said rendering codes are incorporated in said document under control of said application program.

20. The method of claim 19 wherein said updating is information obtained from a source outside said document, the location of said source identified, at least in part, by one or more of said rendering codes.

21. An application program embodied on computer-readable media, said application program comprising:
- formatting control codes for allowing a user to create a document that can subsequently be communicated to a recipient user; said formatting codes inserted by a creator of the document to control the look and feel of the document, such look and feel comprising at least one of the items selected from the list of: font type, font size, paragraphing, line spacing, line numbering, columns, case, margins, paper size; and
- complex rendering codes for allowing said creating user to control the rendering of said document as a complex document by said recipient user, said complex rendering codes inserted by said creating user at the time said document is created to control the addition of material to said document at the time said document is rendered by said recipient user without further assistance by said creating user.

22. The application program as set forth in claim 21 wherein said material to be added is material that need not exist at the time said document was created.

23. The application program as set forth in claim 21 wherein said material to be added is selected from the list of: information from a reference source, delivery instructions, substitute data.

* * * * *

UNITED STATES PATENT AND TRADEMARK OFFICE
CERTIFICATE OF CORRECTION

| | | |
|---|---|---|
| PATENT NO. | : 7,271,929 B1 | Page 1 of 1 |
| APPLICATION NO. | : 10/946597 | |
| DATED | : September 18, 2007 | |
| INVENTOR(S) | : David H. Tannenbaum | |

It is certified that error appears in the above-identified patent and that said Letters Patent is hereby corrected as shown below:

In the Claims:

Column 8, line 59, Claim 19, "the location" should be changed to --a location--.

Column 8, line 60, Claim 19, insert a --,-- after "said recipient" and before "wherein".

Signed and Sealed this
Fifth Day of August, 2014

Michelle K. Lee
*Deputy Director of the United States Patent and Trademark Office*